E. CARUTHERS.
MOWING MACHINE.
APPLICATION FILED DEC. 22, 1913.

1,108,132.

Patented Aug. 25, 1914.

Witnesses
Robert M. Lutphen
A. L. Hind

Inventor
E. CARUTHERS
By Watson E. Coleman
Attorney

UNITED STATES PATENT OFFICE.

EDGAR CARUTHERS, OF HAMSHIRE, TEXAS.

MOWING-MACHINE.

1,108,132.  Specification of Letters Patent.  Patented Aug. 25, 1914.

Application filed December 22, 1913. Serial No. 808,234.

*To all whom it may concern:*

Be it known that I, EDGAR CARUTHERS, a citizen of the United States, residing at Hamshire, in the county of Jefferson and State of Texas, have invented certain new and useful Improvements in Mowing-Machines, of which the following is a specification, reference being had to the accompanying drawings.

This invention relates to certain improvements in mowing machines and the object of the invention is to provide a device of this general character having novel and improved means whereby the same may be employed with convenience for hillside work.

The invention consists in the details of construction and in the combination and arrangement of the several parts of my improved mowing machine, whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1:
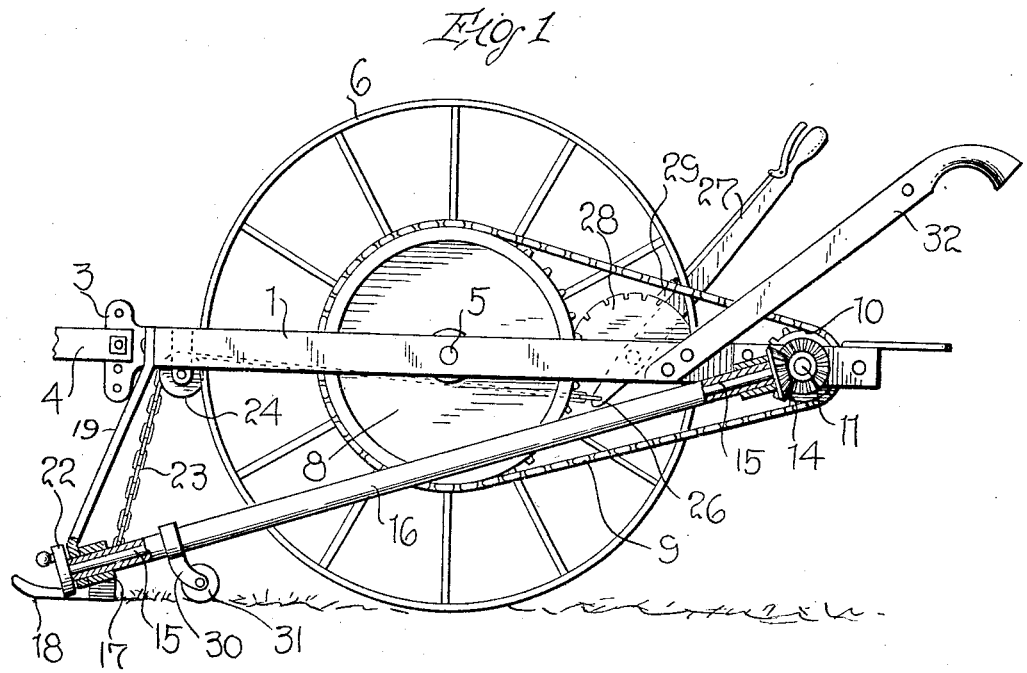
Figure 2:
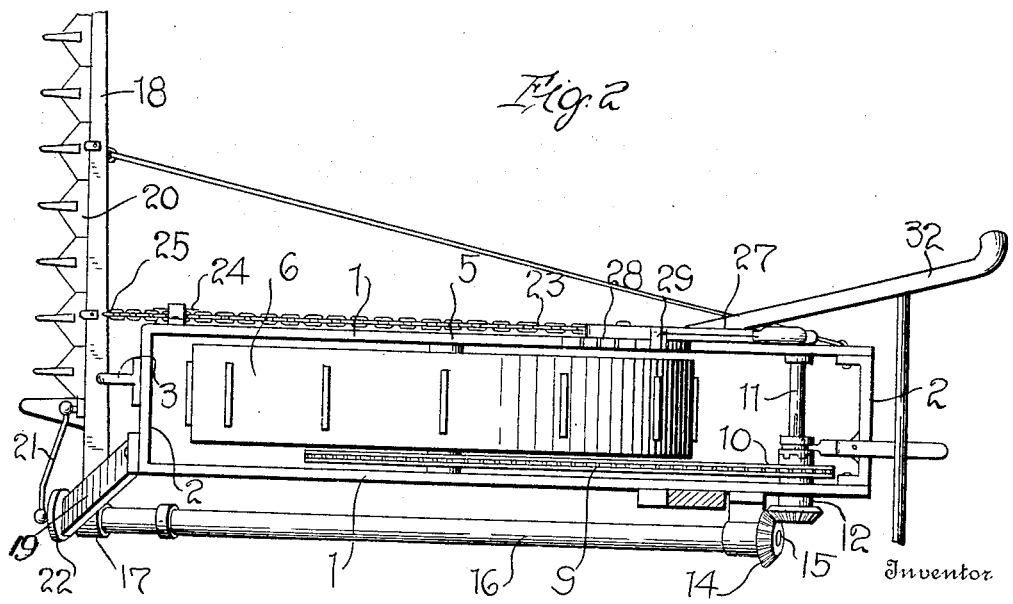

Figure 1 is a view in side elevation, with parts in section, of a mower constructed in accordance with an embodiment of my invention; and Fig. 2 is a top plan view of the device as illustrated in Fig. 1, with certain of the parts being indicated in section.

As disclosed in the accompanying drawings, the frame of the machine comprises the elongated side bars 1—1 and the end bars 2, the forward end bar 2 being provided with a clevis 3 whereby suitable draft rigging 4 may be attached, for a purpose which is believed to be self-evident.

Suitably supported by the side bars 1 at substantially the center thereof is the transverse shaft 5, on which is mounted the traction wheel 6. Operatively connected with the traction wheel 6 is the sprocket wheel 8 of predetermined diameter and around which is directed the chain 9 also passing around a similar sprocket 10 fixed to the shaft 11 suitably supported by the side bars 1 adjacent the rear ends thereof and disposed transversely of the frame. One end portion of the shaft 11 projects beyond a side of the frame, as indicated at 12, such projected portion 12 being operatively connected, as at 14, to the longitudinally directed shaft 15 projecting through the tubular member 16 fixedly connected adjacent its upper extremity to the adjacent side bar 1, the opposite or lower extremity of the tubular member 16 being projected through the lower extremity of an arm 19 depending from the forward end of the frame 1.

Pivotally connected, as at 17, to the forward or lower end of the tubular member 16 is the mower frame 18 disposed transversely of the frame and projecting a predetermined distance beyond the opposite side thereof and including the conventional cutter bar 20, reciprocal movement being imparted to the cutter bar 20 through the medium of the pitman 21 driven by the crank disk 22 fixed to the lower end of the shaft 15.

The pivotal connection between the mower frame 18 and the tubular member 16 is such as to permit such mower frame being adjusted either above or below the horizontal whereby my improved mowing machine may be employed with facility on hill work either from above or below.

In order to impart movement to the mower frame in one direction, namely, upwardly, I employ the flexible member 23 disposed longitudinally of the frame and passing over an idler 24 suitably supported adjacent the forward end of the frame, the forward extremity of such flexible member 23 being suitably secured, as at 25, to the mower frame, while the opposite extremity of such flexible member is suitably connected, as at 26, to the lever member 27 pivotally carried by an adjacent side bar 1 of the frame and adapted to be maintained in its different positions through the medium of the segmental rack 28 coöperating with the latch 29 carried by the lever. As is believed to be obvious, the downward movement of the mower frame will be had by gravity.

In order to maintain the frame 1 against any undue lateral or rocking movement, I have depending from the tubular member 16 adjacent the lower end thereof the post 30 having rotatably supported at its lower end the auxiliary traction wheel 31 whereby it will be readily perceived that my improved mowing machine may be maintained with convenience and facility in operative position.

Suitably secured to the rear end portions of the side bars 1 are the handles 32 whereby the proper balance of the machine may be further maintained by the operator and whereby the direction of travel of the device may be controlled with convenience.

From the foregoing description, it will be seen that a mowing machine constructed in accordance with an embodiment of my invention is extremely simple and which will be efficient in operation and one which is admirably adapted for the attainment of the ends in view. It is to be understood, however, that I do not limit myself to the precise details herein set forth, inasmuch as minor changes may be made therein without departing from the spirit of the invention.

Having thus described my invention what I desire to claim and secure by Letters Patent, is:

A device of the character described including a frame, a traction wheel supporting such frame and mounted thereon, a tubular member carried by the frame adjacent one side thereof and disposed on a downward incline and terminating in close proximity to the surface over which the device travels, the upper extremity of the tubular member being secured to the frame adjacent one end thereof, an arm depending from the forward end of the frame, the lower extremity of the tubular member being disposed through the free extremity of the arm, a shaft directed through such tubular member, a shaft mounted transversely of the frame and rearwardly of the supporting wheel, an operative connection between the transverse shaft and the upper extremity of the shaft disposed through the tubular member, a mowing mechanism pivotally carried by the tubular member rearwardly of the depending arm, an operative connection between the mowing mechanism and the lower extremity of the shaft disposed through such tubular member, and a supporting wheel carried by the tubular member adjacent the lower end thereof and rearwardly of the pivotal connection of the mowing mechanism with the tubular member and adapted to contact with the surface over which the device travels.

In testimony whereof I hereunto affix my signature in the presence of two witnesses.

EDGAR CARUTHERS.

Witnesses:
V. P. GIDDINGS,
GAIL SINGLETON.

---

Copies of this patent may be obtained for five cents each, by addressing the "Commissioner of Patents, Washington, D. C."